United States Patent [19]

Tateyama et al.

[11] Patent Number: 5,204,078
[45] Date of Patent: Apr. 20, 1993

[54] METHOD FOR PRODUCING FLUORINE MICA

[75] Inventors: Hiroshi Tateyama; Kinue Tsunematsu; Kunio Kimura; Hideharu Hirosue; Kazuhiko Jinnai, all of Tosu; Takashi Furusawa, Tagami, all of Japan

[73] Assignees: Co-Op Chemical Co., Ltd.; The Agency of Industrial Science and Technology, both of Tokyo, Japan

[21] Appl. No.: 766,960

[22] Filed: Sep. 25, 1991

Related U.S. Application Data

[63] Continuation of Ser. No. 297,190, Jan. 13, 1989, abandoned.

[30] Foreign Application Priority Data

Jan. 21, 1988 [JP] Japan .................................. 63-12345
Aug. 2, 1988 [JP] Japan .................................. 63-193796

[51] Int. Cl.$^5$ ........................... C01B 7/00; B22B 15/16
[52] U.S. Cl. ..................................... 423/331; 423/332; 423/328.1; 501/122; 501/151; 106/DIG. 3; 252/378 R; 428/363
[58] Field of Search ................... 423/332, 328 T, 331; 252/378 P, 378 R; 501/122, 151; 106/DIG. 3, 417; 428/363

[56] References Cited

U.S. PATENT DOCUMENTS 3,001,571  9/1961  Hatch ........................ 106/DIG. 3
3,057,741 10/1962  Moore ....................... 106/DIG. 3
4,067,819  1/1978  Daimon et al. ............... 106/DIG. 3
4,486,546 12/1984  Murakami et al. ........... 106/DIG. 3
5,023,065  6/1991  Ohno et al. ..................... 423/326
5,049,237  9/1991  Bohrn et al. .................... 162/157.2
5,094,852  3/1992  Ohno et al. ...................... 424/401

FOREIGN PATENT DOCUMENTS 57-82114  5/1982  Japan .................................. 423/331
59-1215   1/1984  Japan .
61-201616 9/1986  Japan .

OTHER PUBLICATIONS

Abstract of Japanese Patent #1215/1984 'Fluorinated mica prodn.-by mixing talc powder with alkali metal fluoride powder and heating mixture', Abstract No. J57082114 (Jan. 1984).
Abstract of Japanese unexamined pat. pub. #201616/1986 'Production of swelling mica' Tateyama et al. (Sep. 1986).

Primary Examiner—Gary P. Straub
Assistant Examiner—Timothy C. Vanoy
Attorney, Agent, or Firm—Frishauf, Holtz, Goodman & Woodward

[57] ABSTRACT

The present invention is a method for producing swellable or nonswellable fluorine mica at a relatively lower temperature by heating a powdery mixture comprising 10 to 35% by weight of an alkali silicofluoride as the main component optionally together with an alkali fluoride and the balance of talc. This fluorine mica is used for pigments, etc.

15 Claims, 10 Drawing Sheets

Added amount of $Na_2SiF_6$ (% by weight)

Added amount X of Na₂SiF₆ (% by weight)
LiF : Na₂SiF₆ = (100−X) : X

Added amount X of Al₂O₃ (% by weight)
(Talc + K₂SiF₆) : Al₂O₃ = (100-X) : X

METHOD FOR PRODUCING FLUORINE MICA

This application is a continuation, of application Ser. No. 07/297,190, filed Jan. 13, 1989 which abandoned on 25 Sep. 1991.

BACKGROUND OF THE INVENTION

1. Field of the Invention

This invention relates to a method for producing swellable fluorine mica having the property of being swelled by readily incorporating moisture in the air into its interlayer site of crystals at room temperature or non-swellable mica.

2. Background Information

This kind of fluorine mica has been prepared in the prior art according to the so-called melting method in which silica, magnesia, alumina and a fluoride are used as the starting material, melted at a high temperature of 1,300° C. or higher and cooled gradually, or according to the so-called solid reaction method in which a mixture of feldspar, olivine, quartz and a fluoride is subjected to the reaction at 1,000° C. or higher for 2 to 24 hours. However, such methods of the prior art had the drawbacks that the reaction temperature was too high, that the reaction time was too long, etc.

Accordingly, in Japanese Patent Publication No. 1215/1984, there has been known a method in which fluorine mica represented by $MF \cdot 3MgO \cdot 4SiO_2$ (wherein M represents K, Na or Li) is produced by adding 15 to 25% by weight of an alkali fluoride powder to talc and heating the mixture at 800° to 1,200° C. However, for making the reaction time within one hour, the temperature must be still maintained at a high temperature of 1,000° C. or higher, and in a practical aspect, it has been desired to further lower the reaction temperature and shorten the maintenance time.

Further, in Japanese Unexamined Patent Publication No. 201616/1986, there is disclosed a method for producing swellable mica represented by $2LiF \cdot 3MgO \cdot 4SiO_2$ by adding 15% by weight of LiF to talc and heating the mixture at 650° to 780° C. However, it has been desired to have a method for obtaining a product substantially comparable in quality with swellable mica obtained by use of LiF as the starting material without using expensive LiF or using it in an amount as small as possible.

SUMMARY OF THE INVENTION

An object of the present invention is to solve such task.

The present invention concerns a method for producing fluorine mica represented by the formula:

$$\alpha MF \cdot \beta(aMgF_2 \cdot bMgO) \cdot \gamma SiO_2$$

(wherein M represents a sodium, lithium or potassium atom, $\alpha$, $\beta$, $\gamma$, a and b each represent a coefficient, satisfying the relation of $0.1 \leq \alpha \leq 2$, $2 \leq \beta \leq 3$, $3 \leq \gamma \leq 4$ and $a+b=1$, preferably $0 < a < 0.2$), which comprises subjecting a fine powdery mixture comprising 10 to 35% by weight of an alkali silicofluoride represented by the formula:

(wherein M is the same as defined above), optionally together with an alkali fluoride, and the balance of talc to heating treatment.

DETAILED DESCRIPTION OF THE INVENTION

When $Na_2SiF_6$ or $Li_2SiF_6$ is used as the starting material, a swelling fluorine mica represented by $\alpha NaF \cdot (or\ LiF) \cdot \beta(aMgF_2 \cdot bMgO) \cdot \gamma SiO_2$ can be easily obtained. In the following, fluorine mica by use of desirable $Na_2SiF_6$ as the starting material is explained, but a similar product can be also obtained when $Li_2SiF_6$ is used as the starting material.

When the amount of $Na_2SiF_6$ added is less than 10% by weight or when on the contrary it exceeds 35% by weight, the percentage of fluorine mica formed is lowered as can be seen in Example 1 shown below and FIG. 1, and therefore the amount of $Na_2SiF_6$ is required to be 10 to 35% by weight, preferably 15 to 30% by weight. The heating temperature during calcination is required to be 700° C. at the lowest, as can be apparently seen from Example 2 shown below and FIG. 2, while if the temperature exceeds 900° C., the yield begins to be slightly lowered, and at higher temperature, the product will be sintered to give rise to such inconvenience as requiring a subsequent crushing step, etc. Thus, the heating temperature may be made preferably 700° to 900° C. The heating temperature also greatly affects swellability, and as the result of measurement of, for example, the fluorine mica produced at 700° to 750° C. by the X-ray powder method, the peak at 9.1 Å (angstrom) also remained separately from the peak at 16.1 Å of the thickness in the direction of C-axis, but it was confirmed that the peak at 9.1 Å substantially disappeared in the fluorine mica produced at 780° C. to 900° C. to be shifted to 16.1 Å. The particle sizes of both talc and $Na_2SiF_6$ can be selected in view of the desirable particle size of the product, but generally desired to be fine, with an average size being preferably about 2 μm or less.

Figure 3:
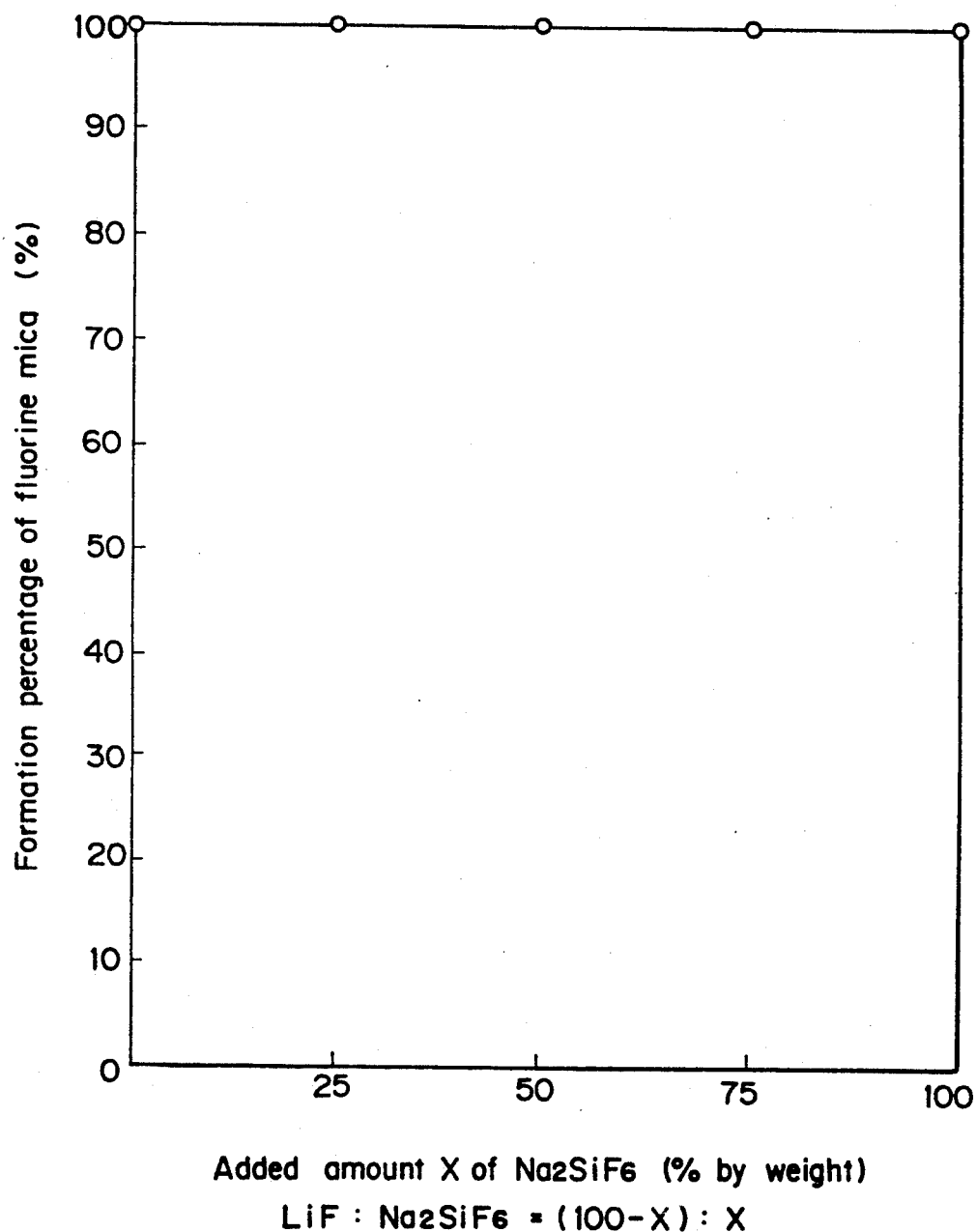
FIG. 3 is a graph of the formation percentage when the formulated ratio of $Na_2SiF_6$ in $Na_2SiF_6 + LiF$ was varied.

In the present invention, it is also possible to use a powdery mixture of $Na_2SiF_6$ and LiF by replacing a part of $Na_2SiF_6$ with LiF, and in this case the objective product can be obtained at the formation percentage of 100% even if the additional amount of $Na_2SiF_6$ is varied as shown in Example 3 and FIG. 3. It, therefore, follows that LiF can be replaced with $Na_2SiF_6$. The powdery mixture of $Na_2SiF_6$ and LiF may be used in an amount of 10 to 35% by weight similarly as in the case of using the above $Na_2SiF_6$ alone, and calcined at 700° to 900° C. to obtain a swellable fluorine mica represented by $\alpha.(cLiF.dNaF).\beta(aMgF_2.bMgO).\gamma SiO_2$ (wherein $\alpha$, $\beta$, $\gamma$, a and b each represent a coefficient as defined above, and c and d each represent a coefficient satisfying the relation of $c+d=1$) (see Example 4 and FIG. 4).

On the other hand, when $K_2SiF_6$ is used as the starting material, a nonswellable fluorine mica represented by $\alpha KF.\beta(aMgF_2.bMgO).\gamma SiO_2$ is easily obtained. When the amount of $K_2SiF_6$ is less than 10% by weight, and when on the contrary it is over 35% by weight, the formation percentage of fluorine mica is lowered as seen in Example 5 shown below and FIG. 5, and therefore the amount of $K_2SiF_6$ added should be 10 to 35% by weight, preferably 15 to 30% by weight, similarly as in the case of swellable fluorine mica. The heating temperture during calcination, as is apparent from Example 6 shown below and FIG. 6, may be preferably 700° C. or higher, and the formation percentage will be lower when the temperature is lower or the maintenance time is shorter. Preferably, heating temperature is 900° C. or higher and the heating time is one hour or more. However, at a temperature higher than 1,200° C., the product will be sintered, whereby giving rise to such inconvenience as requiring a subsequent crushing step. Therefore, the heating temperature is preferably 700° to 1,200° C.

The particle sizes of both talc and $K_2SiF_6$ may be desirably selected in view of the desirable particle size of the product formed, but generally desired to be fine, with an average particle size being preferably about 2 μm or less.

Figure 7:
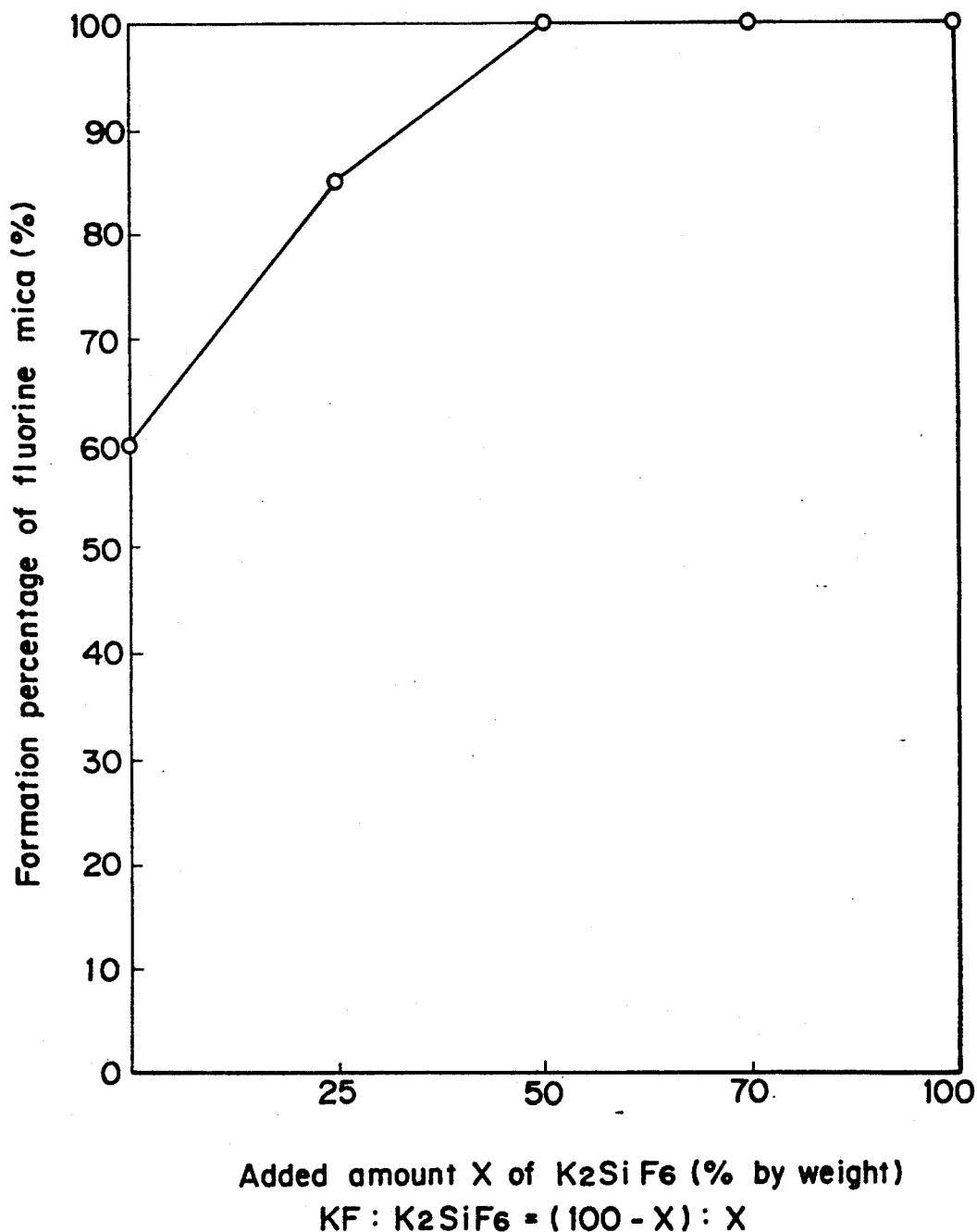
FIG. 7 is a graph of the formation percentage when the formulated ratio of $K_2SiF_6$ in $KF + K_2SiF_6$ was varied.

In the present invention, it is also possible to use a powdery mixture of $K_2SiF_6$ and KF by replacing a part of $K_2SiF_6$ with KF, and the ratio of $K_2SiF_6$ in the total amount of the both is required to be 25% by weight or more of $K_2SiF_6$ as shown in Example 7 and FIG. 7. The powdery mixture of $K_2SiF_6$ and KF can be used in an amount of 10 to 35% by weight, preferably 15 to 30% by weight, with the balance being talc powder, similarly as in the above case of using $K_2SiF_6$ alone, and calcined similarly at 700° to 1,200° C. to obtain a nonswellable fluorine mica represented by $\alpha KF.\gamma(aMgF_2.bMgO).\gamma SiO_2$ (wherein $\alpha$, $\beta$, $\gamma$, a and b each represent a coefficient as defined above).

Further, in the present invention $Al_2O_3$ can be added in an amount of 25% by weight of the total amount, preferably 10 to 20% by weight, to control the properties of the fluorine mica formed, such as swellability and tone. The fluorine mica thus formed can be represented by $\alpha MF.\beta(aMgF_2.bMgO).\delta Al_2O_3.\gamma SiO_2$ (wherein M is the same as defined above, $\alpha$, $\beta$, $\gamma$, a and b each represent a coefficient as defined above, and $\delta$ represents a coefficient satisfying the relation of $0 \leq \delta \leq 1$).

A product approximate to naturally occurring phlogopite can be obtained when prepared with addition of $Al_2O_3$ to $K_2SiF_6$. As shown in Example 8 and FIG. 8, when $Al_2O_3$ is added to $K_2SiF_6$, the formation percentage will not be lowered if the ratio of $Al_2O_3$ added is 25% by weight or lower, preferably 10 to 20% by weight. The calcination temperature in this case is 700° to 1,200° C. as is apparent from Example 8 and FIG. 9, similarly as in the case of using $K_2SiF_6$ alone. The preparation method of adding $Al_2O_3$ and its proportional ratio is applicable also when using a powdery mixture of $Na_2SiF_6$ or $K_2SiF_6$ and KF as the starting material (Example 9 and FIG. 10).

According to the preparation method of the present invention, in obtaining swellable mica, all or a part of expensive LiF can be replaced with relatively inexpensive and readily available $Na_2SiF_6$ or $Li_2SiF_6$, and yet the heating temperature is not required to be so high as 700° C. to 900° C., and also the heating time may be sufficiently one hour, whereby the productivity can be high.

The non-swellable mica obtained by the method of the present invention, which uses $K_2SiF_6$ as a starting material and heats at 700° to 1,200° C., has shapes of hexagonal plates with regular particle sizes, and therefore can be made very thin, and further the whiteness degree is 90 or higher, which is very white as compared with the whiteness degree of about 75.9 of natural mica, and therefore it can be utilized widely as a pigment.

EXAMPLE 1

Talc milled in a ball mill to an average particle size of 2 μm was mixed with $Na_2SiF_6$ with its average particle size being the same as 2 μm at various levels of addition within the range of 40% by weight based on the total amount, and each mixture was placed in a magnetic crucible and maintained in an electric furnace at 800° C. for one hour. The percentage of the fluorine mica produced is shown in FIG. 1. The percentage of the fluorine mica formed is measured by use of the X-ray powder diffraction method and represented in terms of the value obtained by dividing the area of the diffraction peak ($2\theta = 10.0°$ to 5.5°) of the fluorine mica formed by the area of the peak of mica formed in 100%. The same method was used in the following Examples. The percentage of the fluorine mica formed is represented by "formation percentage" hereinafter.

Figure 1:
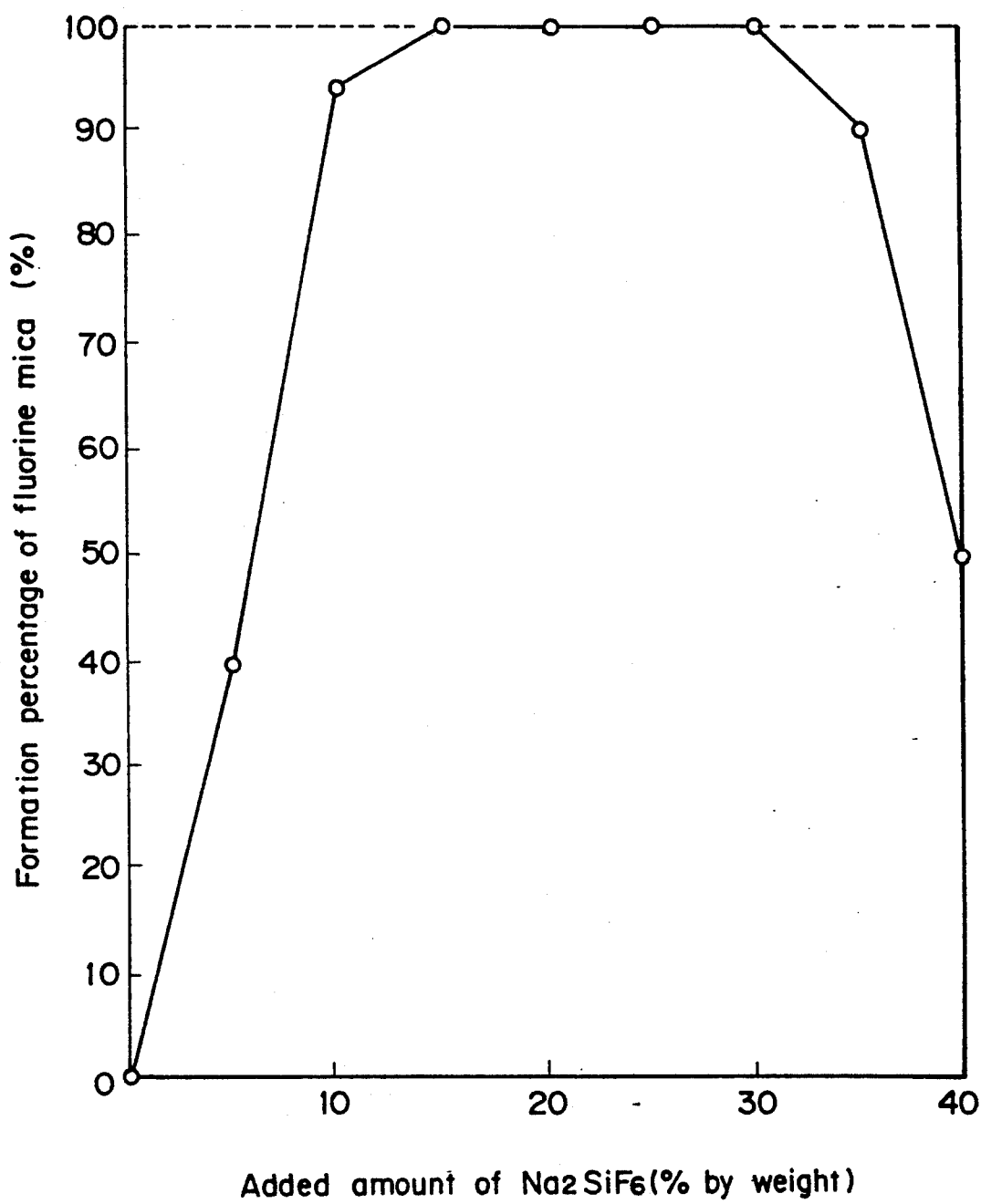
FIG. 1 is a graph showing the percentage of fluorine mica formed when the level of $Na_2SiF_6$ was varied.

From FIG. 1, it can be seen that the percentage of the swellable mica formed is lower in the case when the amount of $Na_2SiF_6$ added is smaller than 10% by weight and in the case, when on the contrary it exceeds 35% by weight.

EXAMPLE 2

By use of talc and $Na_2SiF_6$ with average particle sizes of 2 μm, a mixture consisting of 20% by weight of $Na_2SiF_6$ and the balance of talc was placed in a magnetic crucible, and the heating temperature in the electric furnace was varied (the maintenance time was 1 hour in all the cases). The percentages of fluorine mica produced in this case are shown in FIG. 2.

Figure 2:
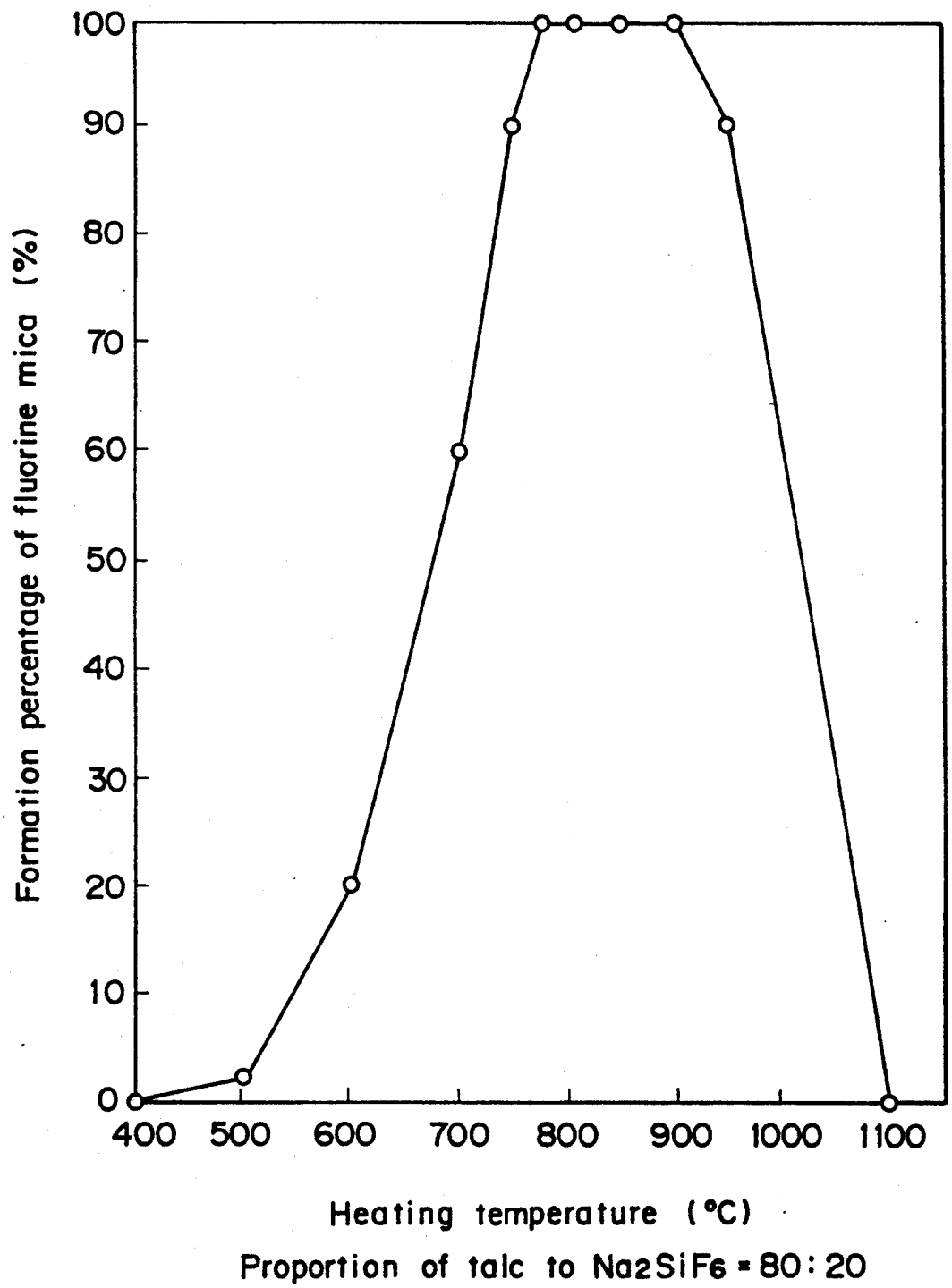
FIG. 2 is a graph of the formation percentage when the heating temperature of talc + $Na_2SiF_6$ was varied.

From FIG. 2, it can be seen that the heating temperature is preferably within the range of from 700° to 900° C., and the percentage formed becomes lower outside of this range.

In this experiment, at a heating temperature of 700° to 750° C., the peak of 9.1 Å also remained separately from the peak 16.1 Å, but it was confirmed that the peak of 9.1 Å substantially disappeared to be shifted to 16.1 Å between 780° and 900° C.

EXAMPLE 3

By use of talc milled in a ball mill to an average particle size of 2 μm and $Na_2SiF_6$ and LiF having similarly the average particle sizes of 2 μm, powdery mixtures were prepared by varying the level of $Na_2SiF_6$ in the total amount of the both, with the total amount of the both being constantly 20% by weight. Each powdery mixture was placed in a magnetic crucible, maintained at 780° C. for one hour in an electric furnace to produce fluorine mica. The results are shown in FIG. 3. It can be seen that the formation percentage was maintained at 100% in the total amount of $Na_2SiF_6+LiF$.

EXAMPLE 4

A powdery mixture with a composition of 80% by weight of talc, 10% by weight of $Na_2SiF_6$ and 10% by weight of LiF which is considered to be the optimum mixed composition as the result of the above Example 3 was placed in a magnetic crucible, and the heating temperature in the electric furnace was varied (the maintenance time was one hour in all the cases) to determine the percentage of fluorine mica formed. The results are shown in Table 4.

Figure 4:
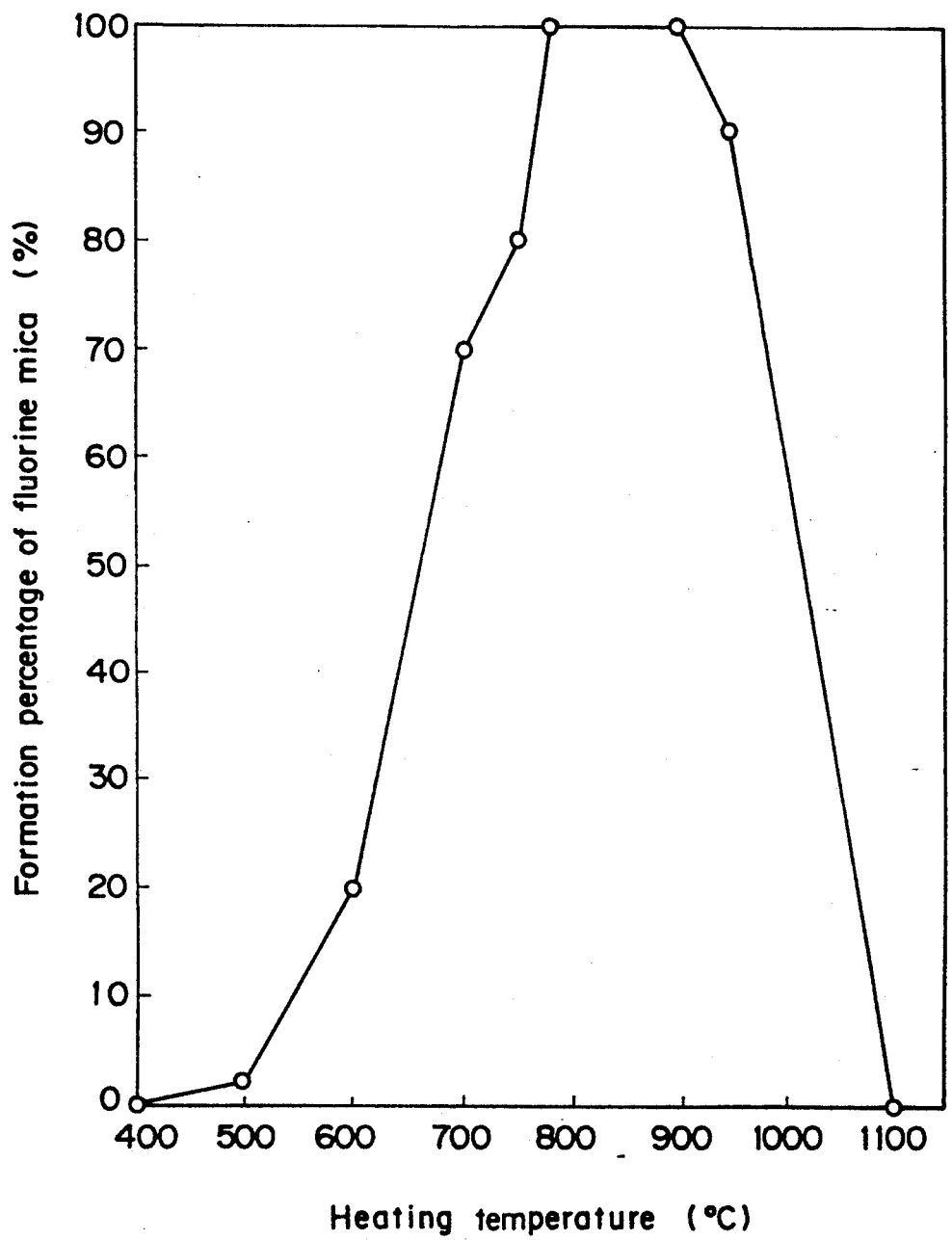
FIG. 4 is a graph of the formation percentage when the heating temperature of talc + $Na_2SiF_6 + LiF$ was varied.

From FIG. 4, it can be seen that the heating temperature is preferably within the range of from 700° to 900° C., and the percentage formed becomes lower outside of this range. In this case, at a heating temperature of 700° to 750° C., the peak of 9.1 Å also remained separately from the peak 16.1 Å, but it was confirmed that the peak of 9.1 Å substantially disappeared to be shifted to 16.1 Å between 780° and 900° C.

EXAMPLE 5

Figure 5:
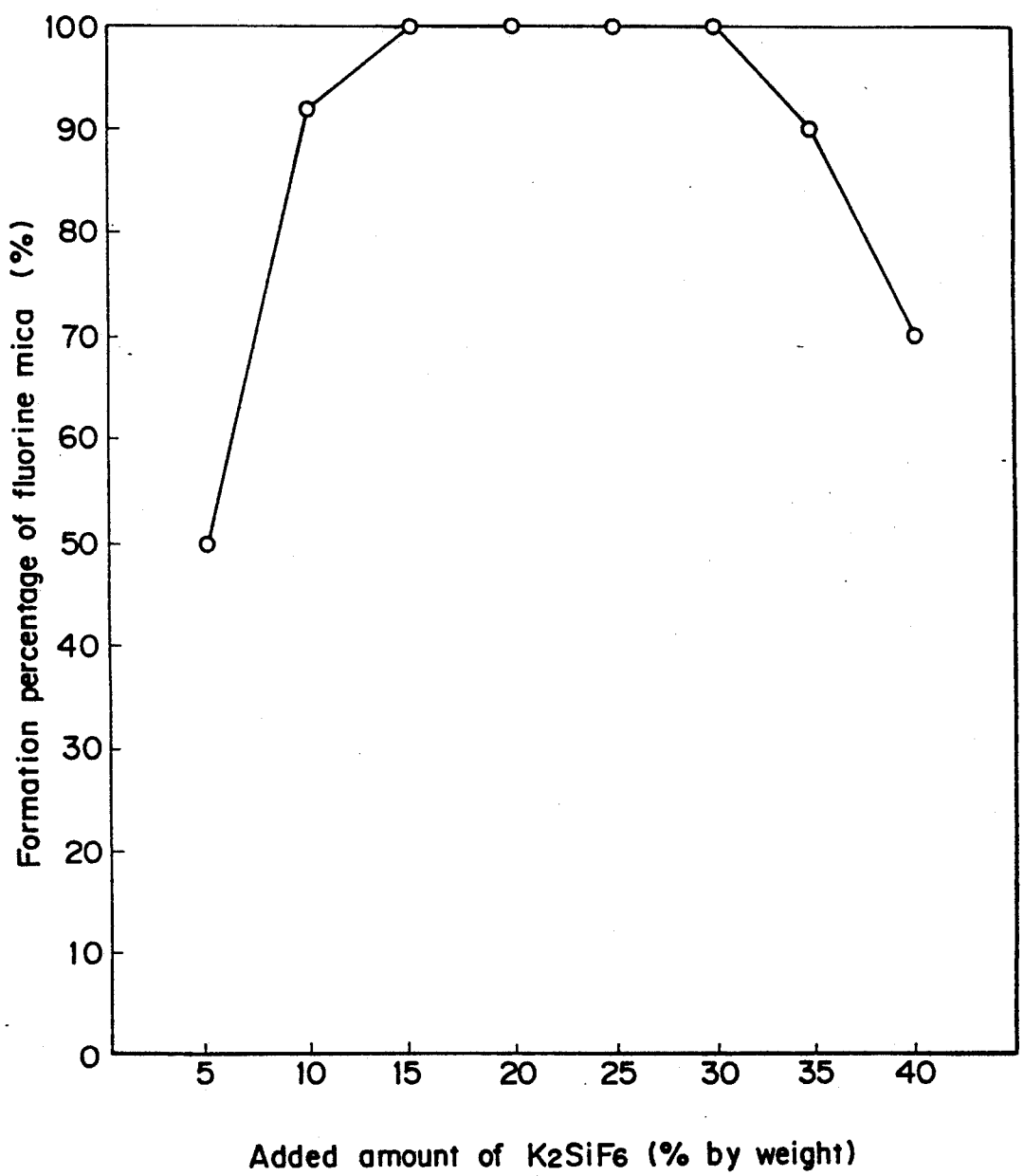
FIG. 5 is a graph of the formation percentage when the level of $K_2SiF_6$ added was varied.

Talc milled in a ball mill to an average particle size of 2 μm was mixed with $K_2SiF_6$ with its average particle size being similarly 2 μm at various levels of addition within the range of 40% by weight based on the total amount, and each mixture was placed in a magnetic crucible and maintained in an electric furnace at 900° C. for one hour. The percentage of the fluorine mica produced is shown in FIG. 5.

It can be seen that the percentage of the mica formed is lower in the case when the amount of $K_2SiF_6$ added is smaller than 10% by weight and in the case, when on the contrary it exceeds 35% by weight.

EXAMPLE 6

By use of talc and $K_2SiF_6$ with average particle sizes of 2 μm, a mixture with a composition of 20% by weight of $K_2SiF_6$ and the balance of talc was placed in a magnetic crucible, and the heating temperature in the electric furnace and the maintenance time were varied. The percentages of fluorine mica formed in this case are shown in FIG. 6.

Figure 6:
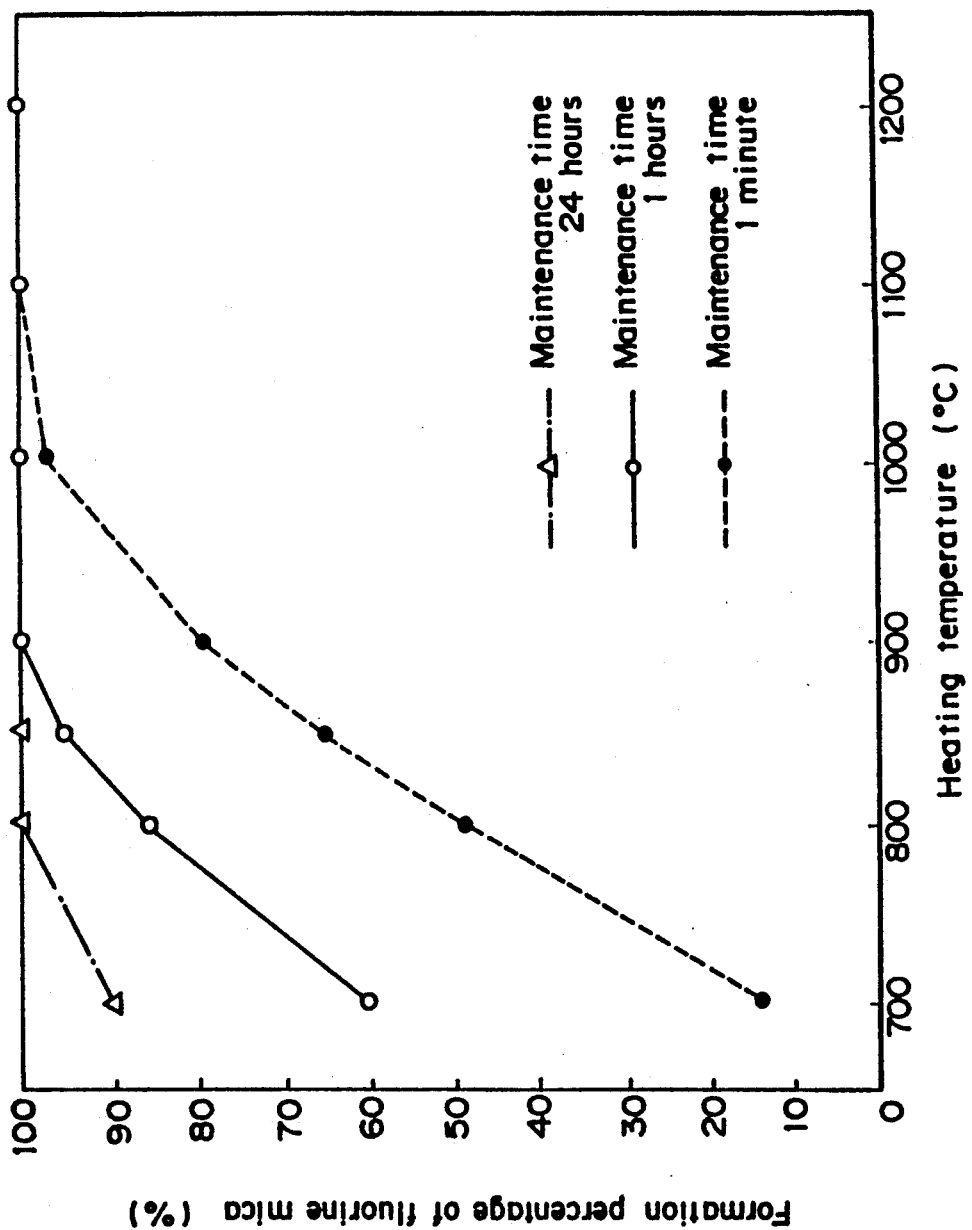
FIG. 6 is a graph of the formation percentage when the heating temperature of talc + $K_2SiF_6$ was varied.

From FIG. 6, it can be seen that the heating temperature is required to be 700° C. at the lowest, more preferably 800° C. or higher. At 1,000° C. or higher, fluorine mica can be obtained under a high ratio within a very short time, but if the temperature is too high, the product may be sintered to involve cumbersomeness such as requiring a subsequent crushing step, etc. Thus, the upper limit of the heating temperature should be made about 1,200° C.

EXAMPLE 7

By use of talc milled in a ball mill to an average particle size of 2 μm and $K_2SiF_6$ and KF having similarly the average particle sizes of 2 μm, powdery mixtures were prepared by varying the level of $K_2SiO_2$ in the total amount of the both, with the total amount of the both being constantly 20% by weight. Each powdery mixture was placed in a magnetic crucible, maintained at 900° C. for one hour in an electric furnace to produce fluorine mica. The results are shown in FIG. 7.

From the results, it can be seen that the percentage of product is lowered when the ratio of $K_2SiF_6$ added is 25% by weight or less.

EXAMPLE 8

Figure 8:
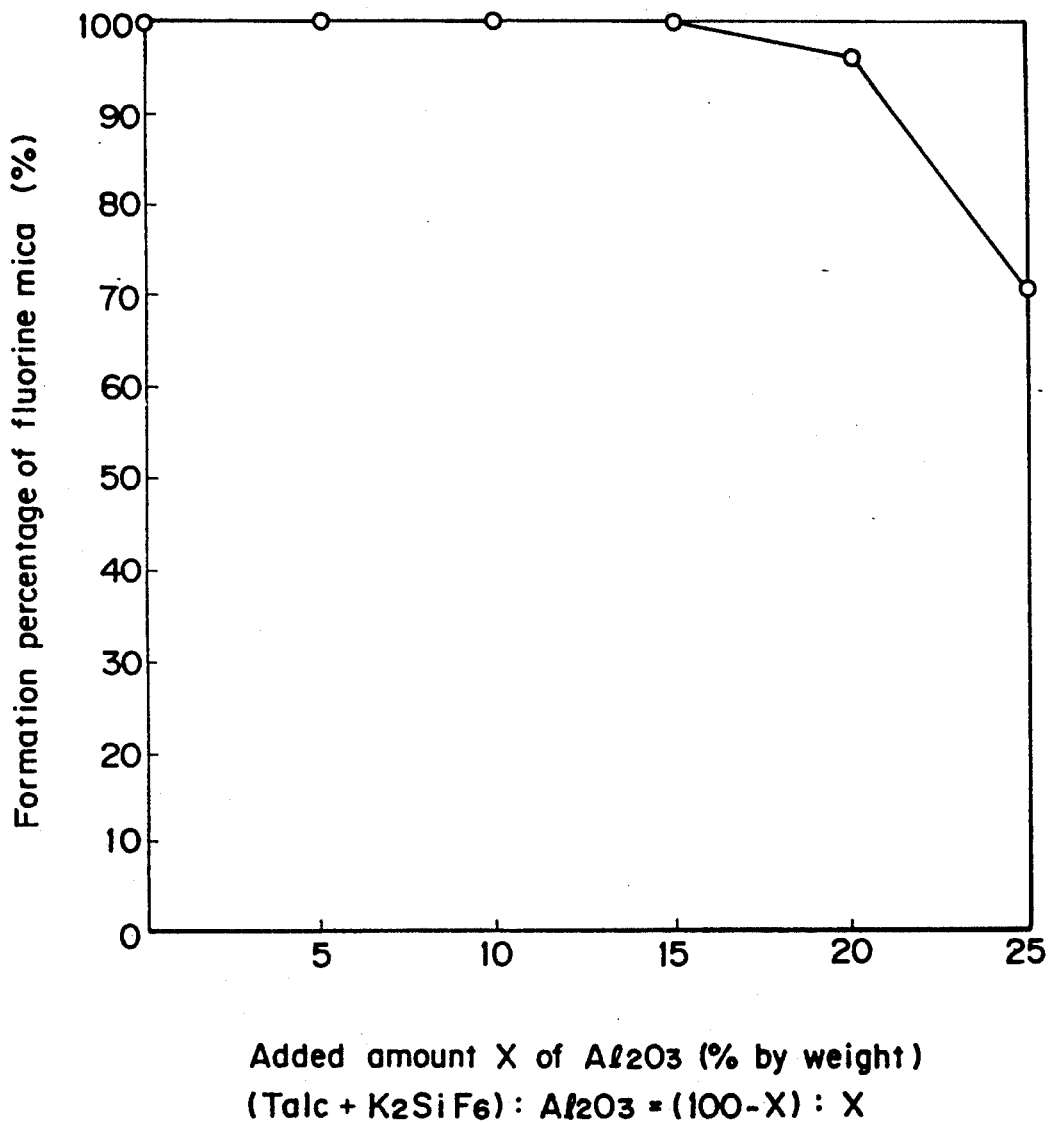
FIG. 8 is a graph of the formation percentage when the amount of $Al_2O_3$ added in talc + $K_2SiF_6 + Al_2O_3$ was varied.

By using further $Al_2O_3$ with an average particle size of 2 μm in addition to the same talc and $K_2SiF_6$ used in the above Example 5, the amount of $Al_2O_3$ added was varied within the range of 25% by weight of the total amount, with the proportion of talc:$K_2SiF_6$ being constantly equal to 80:20, and each composition was maintained at 900° C. for one hour to determine the percentage of fluorine mica formed. The results are shown in FIG. 8, from which it was confirmed that the amount of $Al_2O_3$ added, if it is in the range of 25% by weight or less, preferably 10 to 20% by weight, will not lower the formation percentage to give a product with a composition approximte to naturally occurring phlogopite.

Figure 9:
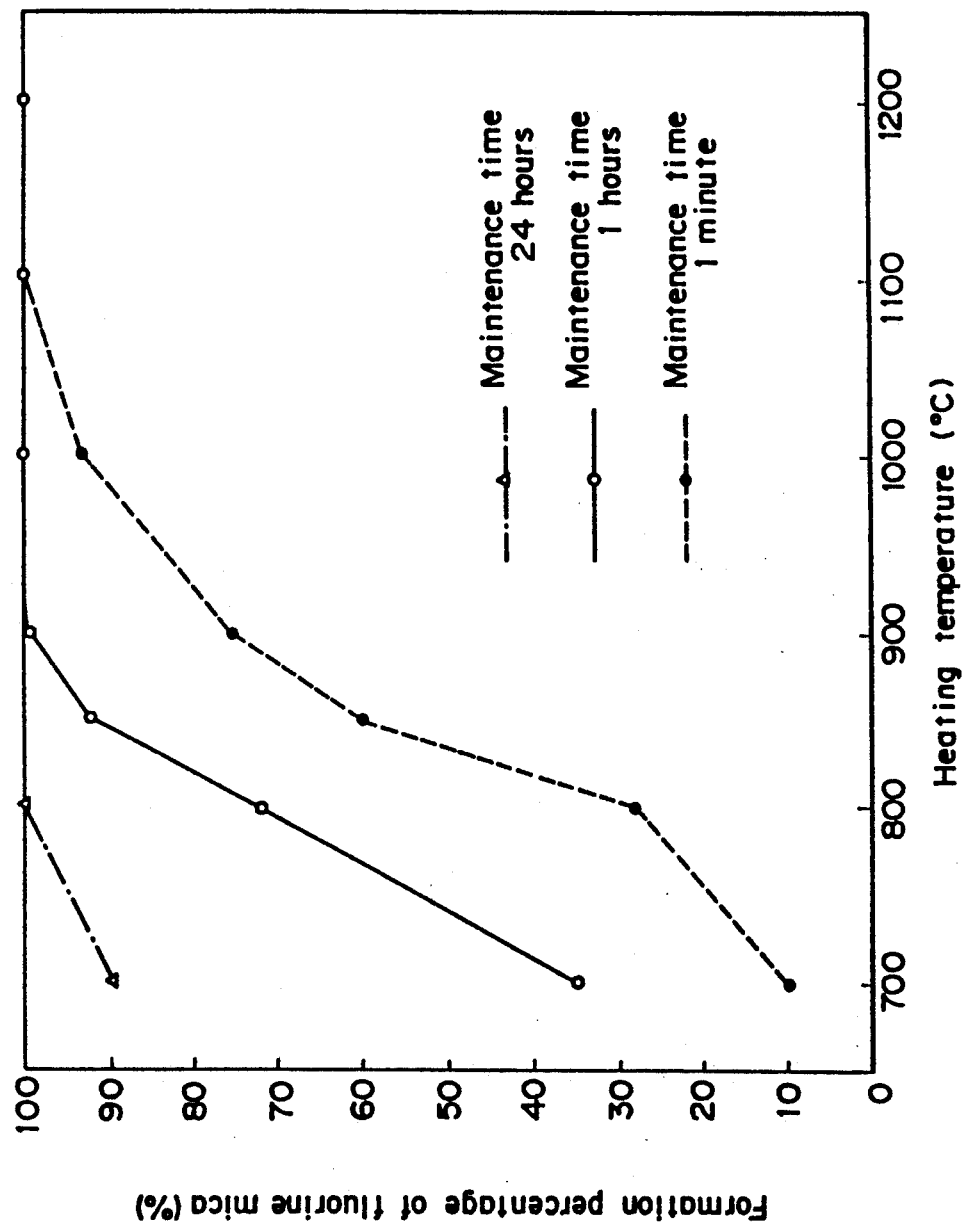
FIG. 9 is a graph of the formation percentage when the heating temperature of talc + $K_2SiF_6 + KF + Al_2O_3$ was varied.

Next, the graph shown in FIG. 9 is obtained by varing the heating temperature and the maintenance time for the mixture with a composition of talc:$K_2SiF_6$:$Al_2O_3$=70 20:10. This result reveals that the heating temperature is required to be 700° C. at the lowest.

EXAMPLE 9

All of the starting powders of talc, $K_2SiF_6$, KF and $Al_2O_3$ used in this Example had average particle sizes of 2 μm, and the mixing ratio of talc:KF:$K_2SiF_6$ was made constantly 80:10:10, with the amount of $Al_2O_3$ added therein being varied within the range of 25% by weight of the total amount, and each composition was maintained at 900° C. for one hour similarly as in Example 8 to determine the percentage of fluorine mica formed. The results are shown in FIG. 10.

Figure 10:
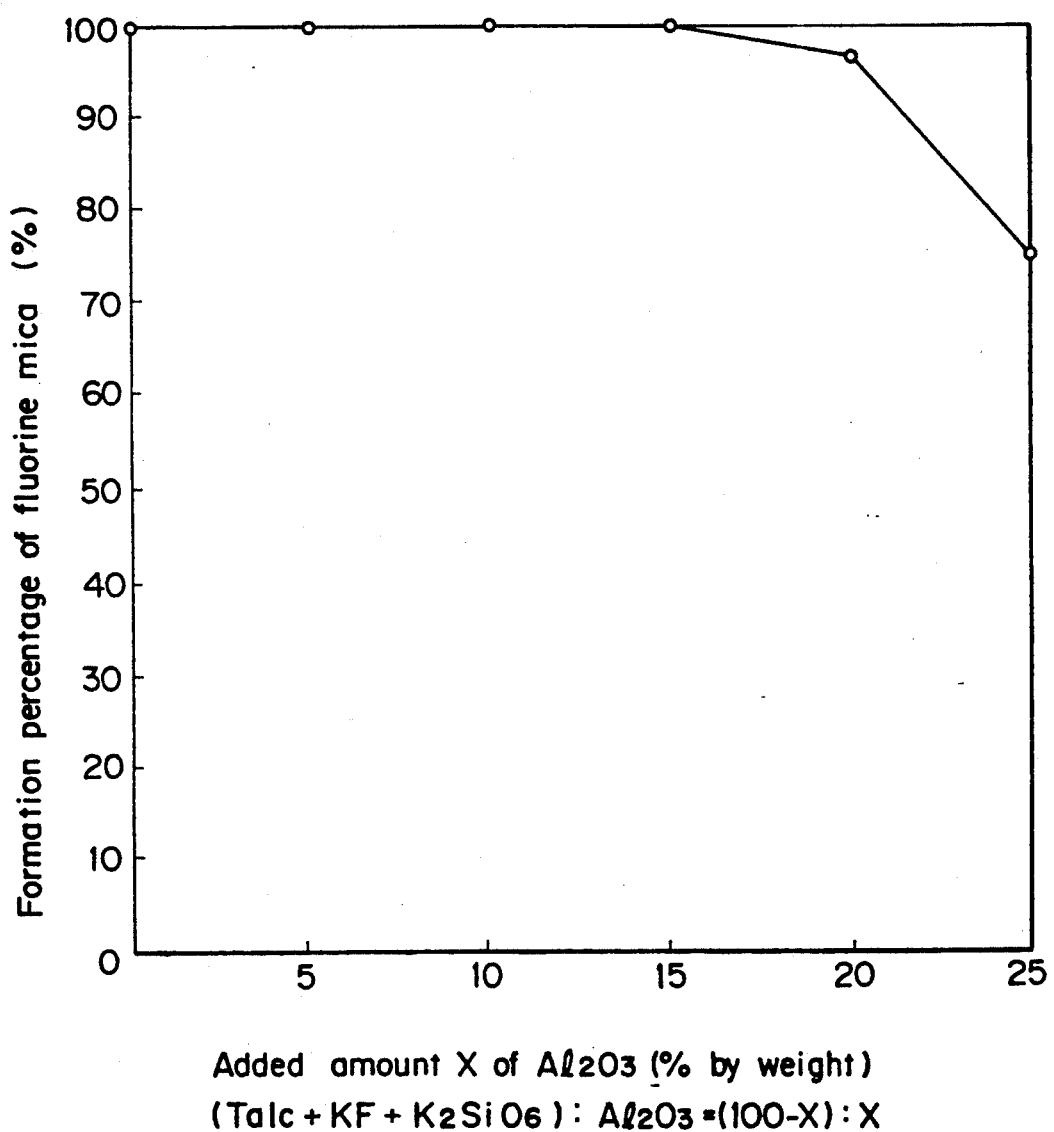
FIG. 10 is a graph showing the formation percentage when the amount of $Al_2O_3$ added in talc + $K_2SiF_6 + KF + Al_2O_3$ was varied.

From FIG. 10, it can be also seen that the amount of $Al_2O_3$ added should preferably be in the range of 10 to 20% by weight of the total amount.

We claim:

1. A method for producing fluorine mica represented by the formula:

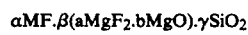

$$\alpha MF \cdot \beta(aMgF_2 \cdot bMgO) \cdot \gamma SiO_2$$

wherein M represents at least one alkali metal selected from the group consisting of sodium atom and potassium atom, α, β, γ, a and b each represent a coefficient satisfying the relationships of $0.1 \leq \alpha \leq 2$, $2 \leq \beta \leq 3$, $3 \leq \gamma \leq 4$ and $a+b=1$, which comprises heating a fine powdery mixture comprising 10 to 35% by weight of an alkali silicofluoride represented by the formula:

$$M_2SiF_6$$

and the balance being talc to a temperature of 700° to 1000° C.

2. The method for producing fluorine mica according to claim 1, wherein the alkali silicofluoride is $Na_2SiF_6$, the heating temperature is 700° to 900° C. and the product is $\alpha NaF \cdot \beta(aMgF_2 \cdot bMgO) \cdot \gamma SiO_2$ where α, β, γ, a and b are the same as defined in claim 1, and is swellable.

3. The method for producing fluorine mica according to claim 1, wherein the alkali silicofluoride is $Na_2SiF_6$.

4. The method for producing fluorine mica according to claim 1, wherein $K_2SiF_6$ is the alkali silicofluoride, and the product is represented by $\alpha KF \cdot \beta(aMgF_2 \cdot bMgO) \cdot \gamma SiO_2$ wherein $\alpha, \beta, \gamma, a$ and $b$ are the same as defined in claim 1, and is non-swellable.

5. The method for producing fluorine mica according to claim 4, wherein said fine powdery mixture comprises 10 to 35% by weight of a mixture of $K_2SiF_6$ and KF containing $K_2SiF_6$ at a ratio of 25% by weight or more and the balance being talc, and the product is represented by the formula:

$$\alpha KF \cdot \beta(aMgF_2 \cdot bMgO) \cdot \gamma SiO_2$$

wherein $\alpha, \beta, \gamma, a$ and $b$ are the same as defined in claim 1, and is non-swellable.

6. A method for producing a non-swellable fluorine mica represented by the formula: $\alpha MF \cdot \beta (A\ MgF_2 \cdot b MgO) \cdot \delta Al_2O_3 \gamma SiO$ wherein M represents at least one alkali metal selected from the group consisting of sodium atom and potassium atom, $\alpha, \beta, \gamma, \delta, a$ and $b$ each represent a coefficient satisfying the relationships of $0.1 \leq \alpha \leq 2$, $2 \leq \beta \leq 3$, $3 \leq \gamma \leq 4$, $0 \leq \delta \leq 1$, and $a+b=1$, which comprises heating a fine powdery mixture comprising 10 to 35% by weight of a mixture of $M_2SiF_6$, 25% by weight or less of $Al_2O_3$ and the balance being talc.

7. The method for producing fluorine mica according to claim 6, wherein said fine powdery mixture comprises 10 to 35% by weight of a mixture of $K_2SiF_6$ and KF containing $K_2SiF_6$ at a ratio of 25% by weight or more, 10 to 20% by weight of $Al_2O_3$ and the balance being talc, and the product is represented by the formula:

$$\alpha KF \cdot \beta(aMgF_2 \cdot bMgO) \cdot \delta Al_2O_3 \cdot \gamma SiO_2$$

wherein $\alpha, \beta, \gamma, a$ and $b$ are the same as defined in claim 1, and $\delta$ represents a coefficient satisfying the relation of $0 \leq \delta \leq 1$, and is non-swellable.

8. The method for producing fluorine mica according to claim 7, wherein the mixture has a composition of talc:KF:$K_2SiF_6$=80:10:10.

9. The method for producing fluorine mica according to claim 6, wherein $M_2SiF_6$ is $K_2SiF_6$ and the product is non-swellable.

10. The method for producing fluorine mica according to claim 6, wherein the $Al_2O_3$ is in an amount of 10 to 20% by weight and the $Al_2O_3$ has a particle size of 2 $\mu m$ or less.

11. The method for producing fluorine mica according to claim 6, wherein M is K and the mixture has a composition of talc:$K_2SiF_6$:$Al_2O_3$=70:20:10.

12. The method for producing fluorine mica according to claim 1, wherein the fine powdery mixture comprises 15 to 30% by weight of said alkali silicofluoride and said alkali silicofluoride is sodium silicofluoride.

13. The method for producing fluorine mica according to claim 12, wherein the temperature is 700° to 900° C.

14. The method for producing fluorine mica according to claim 13, wherein the particle sizes of the talc and the sodium silicofluoride are 2 $\mu m$ or less.

15. The method for producing fluorine mica according to claim 12, wherein the mixture comprises 20% by weight of said silicofluoride; said silicofluoride has an average particle size of 2 $\mu m$; and said talc having an average particle size of 2 $\mu m$.

* * * * *